(12) United States Patent
Ramos et al.

(10) Patent No.: US 11,667,071 B2
(45) Date of Patent: Jun. 6, 2023

(54) INKJET 3D PRINTING OF MULTI-COMPONENT RESINS

(71) Applicant: Inkbit, LLC, Medford, MA (US)

(72) Inventors: Javier Ramos, Brookline, MA (US); Gregory Ellson, Cambridge, MA (US); David B. Russell, Somerville, MA (US); Wenshou Wang, Quincy, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/684,733

(22) Filed: Nov. 15, 2019

(65) Prior Publication Data

US 2020/0156308 A1 May 21, 2020

Related U.S. Application Data

(60) Provisional application No. 62/768,148, filed on Nov. 16, 2018.

(51) Int. Cl.
*B29C 64/112* (2017.01)
*B29C 64/35* (2017.01)
(Continued)

(52) U.S. Cl.
CPC .......... *B29C 64/112* (2017.08); *B29C 64/209* (2017.08); *B29C 64/255* (2017.08); *B29C 64/314* (2017.08); *B29C 64/343* (2017.08); *B29C 64/35* (2017.08); *B29C 64/357* (2017.08); *B33Y 10/00* (2014.12); *B33Y 30/00* (2014.12); *B33Y 40/00* (2014.12)

(58) Field of Classification Search
CPC ... B29C 64/112; B29C 64/314; B29C 64/357; B29C 64/255; B29C 64/343; B29C 64/209; B29C 64/35; B33Y 10/00; B33Y 30/00; B33Y 40/00
See application file for complete search history.

(56) References Cited

U.S. PATENT DOCUMENTS

| | | |
|---|---|---|
| 5,460,758 A | 10/1995 | Langer et al. |
| 6,492,651 B2 | 12/2002 | Kerekes |

(Continued)

FOREIGN PATENT DOCUMENTS

| | | |
|---|---|---|
| EP | 3459716 A1 | 3/2019 |
| JP | 2014098555 A | 5/2014 |

(Continued)

OTHER PUBLICATIONS

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

(Continued)

*Primary Examiner* — Larry W Thrower
(74) *Attorney, Agent, or Firm* — Occhiuti & Rohlicek LLP

(57) ABSTRACT

An inkjet printer includes a mixer and a metering system that system provides appropriate amounts of the resin's precursors into the mixer. The mixer thoroughly mixes these precursors and feeds the resulting resin to the printheads. The inkjet printer may include a cleaning system that removes residual resin during or after printing.

19 Claims, 2 Drawing Sheets

(51) Int. Cl.
*B29C 64/314* (2017.01)
*B29C 64/357* (2017.01)
*B29C 64/255* (2017.01)
*B29C 64/343* (2017.01)
*B29C 64/209* (2017.01)
*B33Y 10/00* (2015.01)
*B33Y 30/00* (2015.01)
*B33Y 40/00* (2020.01)

(56) References Cited

U.S. PATENT DOCUMENTS

| | | | |
|---|---|---|---|
| 9,562,759 | B2 | 2/2017 | Vogler et al. |
| 9,952,506 | B2 | 4/2018 | Arai et al. |
| 10,011,071 | B2 | 7/2018 | Batchelder |
| 10,252,466 | B2 | 4/2019 | Ramos et al. |
| 10,456,984 | B2 | 10/2019 | Matusik et al. |
| 2002/0104973 | A1 | 8/2002 | Kerekes |
| 2004/0085416 | A1* | 5/2004 | Kent ............ B41J 2/18 347/89 |
| 2004/0114002 | A1* | 6/2004 | Kosugi ........ B41J 2/17546 347/86 |
| 2004/0173946 | A1 | 9/2004 | Pfeifer et al. |
| 2006/0007254 | A1* | 1/2006 | Tanno ............ B41J 2/175 347/7 |
| 2007/0106172 | A1 | 5/2007 | Abreu |
| 2007/0241482 | A1 | 10/2007 | Giller et al. |
| 2008/0124475 | A1 | 5/2008 | Kritchman |
| 2009/0073407 | A1 | 3/2009 | Okita |
| 2009/0105605 | A1 | 4/2009 | Abreu |
| 2009/0220895 | A1 | 9/2009 | Garza et al. |
| 2009/0279089 | A1 | 11/2009 | Wang |
| 2009/0279098 | A1 | 11/2009 | Ohbayashi et al. |
| 2010/0140550 | A1 | 6/2010 | Keller et al. |
| 2010/0158332 | A1 | 6/2010 | Rico et al. |
| 2012/0275148 | A1 | 11/2012 | Yeh et al. |
| 2013/0182260 | A1 | 7/2013 | Bonnema et al. |
| 2014/0249663 | A1 | 9/2014 | Voillaume |
| 2014/0300676 | A1 | 10/2014 | Miller et al. |
| 2014/0328963 | A1 | 11/2014 | Mark et al. |
| 2015/0061178 | A1 | 3/2015 | Siniscalchi et al. |
| 2015/0101134 | A1 | 4/2015 | Manz et al. |
| 2015/0124019 | A1* | 5/2015 | Cruz-Uribe ............ B41J 2/14 347/18 |
| 2015/0352792 | A1 | 12/2015 | Kanada |
| 2016/0018404 | A1 | 1/2016 | Iyer et al. |
| 2016/0023403 | A1 | 1/2016 | Ramos et al. |
| 2016/0157751 | A1 | 6/2016 | Mahfouz |
| 2016/0167301 | A1 | 6/2016 | Cole et al. |
| 2016/0209319 | A1 | 7/2016 | Adalsteinsson et al. |
| 2016/0249836 | A1 | 9/2016 | Gulati et al. |
| 2016/0320771 | A1 | 11/2016 | Huang |
| 2016/0347005 | A1 | 12/2016 | Miller |
| 2017/0021455 | A1 | 1/2017 | Dallarosa et al. |
| 2017/0106604 | A1 | 4/2017 | Dikovsky et al. |
| 2017/0120337 | A1 | 5/2017 | Kanko et al. |
| 2017/0143494 | A1 | 5/2017 | Mahfouz |
| 2017/0217103 | A1 | 8/2017 | Babaei et al. |
| 2017/0355147 | A1* | 12/2017 | Buller ............ B29C 64/153 |
| 2018/0017501 | A1 | 1/2018 | Trenholm et al. |
| 2018/0056288 | A1* | 3/2018 | Abate ............ G01N 15/1484 |
| 2018/0056582 | A1 | 3/2018 | Matusik et al. |
| 2018/0071984 | A1 | 3/2018 | Lee et al. |
| 2018/0099333 | A1 | 4/2018 | DehghanNiri et al. |
| 2018/0143147 | A1 | 5/2018 | Milner et al. |
| 2018/0169953 | A1 | 6/2018 | Matusik et al. |
| 2018/0194066 | A1 | 7/2018 | Ramos et al. |
| 2018/0273657 | A1 | 9/2018 | Wang et al. |
| 2018/0281067 | A1 | 10/2018 | Small et al. |
| 2018/0297113 | A1 | 10/2018 | Preston et al. |
| 2018/0304549 | A1 | 10/2018 | Safai et al. |
| 2018/0311893 | A1 | 11/2018 | Choi et al. |
| 2018/0320006 | A1 | 11/2018 | Lee et al. |
| 2018/0341248 | A1 | 11/2018 | Mehr et al. |
| 2018/0348492 | A1 | 12/2018 | Pavlov et al. |
| 2019/0077921 | A1 | 3/2019 | Eckel |
| 2019/0271966 | A1 | 9/2019 | Coffman et al. |
| 2019/0322031 | A1 | 10/2019 | Kritchman |
| 2019/0329322 | A1 | 10/2019 | Preston et al. |
| 2019/0346830 | A1 | 11/2019 | de Souza Borges Ferreira et al. |
| 2019/0353767 | A1 | 11/2019 | Eberspach et al. |
| 2020/0143006 | A1 | 5/2020 | Matusik et al. |
| 2020/0147888 | A1 | 5/2020 | Ramos et al. |
| 2020/0215761 | A1 | 7/2020 | Chen et al. |

FOREIGN PATENT DOCUMENTS

| | | | |
|---|---|---|---|
| JP | 6220476 B1 | | 10/2017 |
| JP | 2018103488 A | | 7/2018 |
| KR | 101567281 B1 | | 11/2015 |
| KR | 20180067961 A | | 6/2018 |
| WO | WO 2003/026876 | * | 4/2003 |
| WO | 2017066077 A1 | | 4/2017 |
| WO | 2018080397 A1 | | 5/2018 |
| WO | 2018197376 A1 | | 11/2018 |
| WO | 2018209438 A1 | | 11/2018 |
| WO | 2019070644 A2 | | 4/2019 |
| WO | 2019125970 A1 | | 6/2019 |
| WO | 2020123479 A1 | | 6/2020 |

OTHER PUBLICATIONS

Klein, Thomas, and Robert Huber. "High-speed OCT light sources and systems." Biomedical optics express 8, No. 2 (2017): 828-859.
Moon, Sucbei, and Dug Young Kim. "Ultra-high-speed optical coherence tomography with a stretched pulse supercontinuum source." Optics Express 14, No. 24 (2006): 11575-11584.
Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.
Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.
Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.
Zhou, Chao, Aneesh Alex, Janarthanan Rasakanthan, and Yutao Ma. "Space-division multiplexing optical coherence tomography." Optics express 21, No. 16 (2013): 19219-19227.
Alarousu, Erkki, Ahmed AlSaggaf, and Ghassan E. Jabbour. "Online monitoring of printed electronics by spectral-domain optical coherence tomography." Scientific reports 3 (2013): 1562.
Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].
Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.
Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.
Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.
Blanken, Lennart. "Learning and repetitive control for complex systems: with application to large format printers." (2019).
Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

(56) References Cited

OTHER PUBLICATIONS

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.
Kulik, Eduard A., and Patrick Calahan. "Laser profilometry of polymeric materials." Cells and Materials 7, No. 2 (1997): 3.
Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).
DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).
International Preliminary Report on Patentability dated May 27, 2021 in PCT Application No. PCT/US2019/061585.

\* cited by examiner

INKJET 3D PRINTING OF MULTI-COMPONENT RESINS

CROSS-REFERENCES TO RELATED APPLICATIONS

This application claims the benefit of the Nov. 16, 2018 priority date of U.S. Provisional Application No. 62/768,148, the contents of which are herein incorporated by reference.

BACKGROUND OF THE INVENTION

The present invention relates to additive manufacturing processes based on inkjet technology.

Additive manufacturing is used for fabricating objects via selective addition of material. A typical additive manufacturing process works by slicing a digital model, such as that represented using an STL file, into a series of layers. Data representative of those layers is then sent to a fabrication apparatus that deposits the layers one by one from the bottom to the top.

A particularly useful technique for additive manufacturing is 3D inkjet printing. This requires the use of an inkjet printer. In such printers, a printhead selectively ejects droplets of liquid ink in a manner dictated by the digital model. The liquid ink is solidified using UV or visible-light radiation.

A difficulty that arises in 3D inkjet printing is that of finding an appropriate ink. The ink should ultimately be able to solidify to form a three-dimensional structure. However, while it is in the inkjet printer, it must remain liquid. Otherwise, it cannot be efficiently ejected from the print head. For use in an inkjet printer, the ink preferably has a viscosity within a range of three to twenty centipoise at the operating conditions and a surface tension between twenty and forty-five millinewtons per meter. Since unused ink may remain in the inkjet printer after being used, the ink should also have enough thermal stability and formulation stability so that it can maintain these properties for a reasonably long time within a reasonable range of temperatures.

These requirements result in a limited range of materials that can be used as an ink.

SUMMARY OF THE INVENTION

Many potentially useful inks have been ruled out because of their lack of formulation stability. Such inks are considered unusable for inkjet printing because they are prone to undergo changes in rheological properties even in the relatively short time in which they are within a printer. When such inks are used in a conventional inkjet printer, there exists a possibility of clogging the printer and perhaps ruining it.

Among the more desirable inks would be resins, such as polyurethanes, polythiourethanes, two-part epoxies, and two-part silicones. Such resins can achieve a wide range of desirable properties such as high toughness, heat deflection temperature, or elongation at break.

The foregoing resins are made by combining precursors. When mixed to form the resin, the precursors undergo a chemical reaction. This reaction changes the resin's material properties. In effect, such a resin begins to cure as soon as it is made. The rate of change of the material properties defines the resin's "pot life." Many of these resins have limited pot lives. This impairs their ability to be used in a printer.

The present invention allows these resins to nevertheless be used for 3D printing by an inkjet printer. It does so by mixing the resin's precursors at a point just upstream of the printhead and just before the resin is to be used. In some embodiments, additional steps are taken to ensure that the resin's properties remain suitable for being jetted out by the print head. Of particular importance is ensuring that the resin's viscosity remains in a usable range.

In one aspect, the invention features an inkjet printer that includes a mixer and a metering system. The metering system provides appropriate amounts of the resin's precursors into the mixer. The mixer thoroughly mixes these precursors and feeds the resulting resin to the printheads. A cleaning system removes residual resin during or after printing.

The metering system precisely delivers the correct amounts of each precursor into the mixer. This is particularly important because significant deviations from an optimal mixing ratio negatively affect the properties of the cured resin. Embodiments include those in which the metering system includes a syringe pump, a diaphragm pump, a peristaltic pump, a piston pump, and a positive displacement pump.

The mixer mixes the precursors into a homogenous solution or dispersion. Embodiments of the mixer include active mixers and passive mixers.

In a passive mixer, the fluids mix by flowing together through a convoluted path. Examples of passive mixers include microfluidic arrays, "screw" type mixers, and "x-grid" mixers.

An active mixer applies energy to the precursors in an effort to mix them. In some embodiments, the energy is kinetic energy that comes from one or more moving structures that have been immersed in the precursor mixture. Examples of moving structures include rotating rods, paddles, or whisks, either alone or in series. Other active mixers use energy to cause mechanical vibrations in the precursors. These include mixers that rely on ultrasonic or megasonic waves. In either case, the mixer preferably mixes the precursors with high efficiency with a small form factor, and high throughput, and without introducing air bubbles. The result of this mixing process is fresh resin.

The feed system holds the fresh resin at the correct temperature and pressure and feeds it to the inkjet printheads. Some embodiments feature a temperature-control system to extend the resin's pot life.

Other embodiments feature a pressure controller to promote the printhead's ability to eject the resin.

Yet other embodiments are those in which the feed system includes one or more sensors and a controller. This provides a basis for feedback control of the feed system.

In some embodiments, the sensor transmits, to the controller, a signal indicative of a dwindling supply of resin. In response, the controller triggers the metering and mixing of precursors to form additional fresh resin. Among these feed systems are those that include multiple chambers and pressure controllers to cause fluid to recirculate through certain printheads. Other feed systems omit such recirculation structures.

In other embodiments, the sensor transmits, to the controller, a signal indicative of a property of a resin. For example, the sensor may provide a signal indicative of the resin's temperature, its viscosity, or some parameter indicative of the extent to which its properties have been impaired by aging or premature curing.

Embodiments include those that print using only a single printhead and those that print using plural printheads. Consequently, embodiments include those in which the feed system serves one printhead and those in which it serves multiple printheads.

The fresh resin ages quickly. When it does, it becomes unusable. It is therefore useful to clean the printer frequently to avoid the presence of aged resin.

To promote the ability to conveniently clean the printer and to remove any built-up cured resin, some embodiments include a cleaning system that flushes cleaning solution through those components that are routinely exposed to the resin. The cleaning solution is preferably a fluid that efficiently dissolves the resin. However, many printer components are also made of plastic resins. Hence, the cleaning solution is preferably one that dissolves the resin without damaging the printer's components. Examples of suitable cleaning solutions include Dowanol TPM (tripropylene glycol methyl ether) and Dowanol DPMA (dipropylene glycol methyl ether acetate).

The cleaning system thus flushes the cleaning solution through the same paths that the resin has traversed. These paths include the mixer, the feed system, and the printhead. Such a cleaning system removes remove residual resin before it has a change to clog the printer.

In some embodiments, the cleaning system introduces cleaning solution into the feed system through a separate port or nozzle. This promotes more effective cleaning.

Other embodiments include an outlet valve or port to drain resin that is approaching the end of its pot life before that resin has the opportunity to congeal within the printer.

In one aspect, the invention features a feed system for an inkjet printer. The feed system mixes precursors to form a resin for delivery to a printhead of the printer.

Among the embodiments of the invention are those in which the feed system includes metering pumps that provide precursors to a mixer that mixes the precursors to form the resin. This resin is then provided to the printhead for ejection. Among these embodiments are those that also include a valve that connects to the first and second metering pumps, the mixer, and a cleaning system a cleaning system that removes residual resin from those components of said inkjet printer that come into contact with said resin. When the pump is in an operating state, the valve connects the metering pumps to the mixer and disconnects the cleaning system from the mixer. When the pump transitions into a cleaning state, the pump connects the cleaning system to the mixer and disconnects the metering pumps from the mixer.

In some embodiments, precursors are metered into an in-line mixer. Among these are embodiments in which the in-line mixer is an active mixer and embodiments in which the in-line mixer is a passive mixer. Examples of active mixers include those with rotating rods or paddles and those that apply ultrasonic or megasonic energy for mixing. Examples of passive mixers are those that guide the precursors through a winding path to promote mixing.

Some embodiments include a reservoir that provides resin to one or more printheads, the reservoir being pressurized to a controlled pressure.

Among the embodiments that feature a reservoir are those that include a recirculation system. As a result of the circulation system, at least some resin that has been delivered to the printhead from the reservoir is returned to the reservoir and recirculated for delivery to the printhead from the reservoir.

Also among these embodiments are those in which the reservoir includes a storage compartment, a return compartment, and a recirculation pump. In these embodiments, resin from the storage compartment that has been delivered to the printhead is returned to the return compartment and pumped back to the storage compartment by the recirculation pump.

Some embodiments of the apparatus include a cleaning system configured to remove residual resin from those components of the inkjet printer that come into contact with the resin.

In other embodiments of the apparatus, one or more components of the feed system that are in contact with the resin are modular and replaceable.

In yet other embodiments, components through which the resin pass define a fluid path that has been streamlined to reduce the number of dead zones. Among these are paths that have no dead zones.

Embodiments further include those that have a heat-transfer system for causing heat to flow towards or away from the resin. Cooling the resin reduces the rate of reaction and thus extends its pot life. Heating the resin tends to lower viscosity and to thus promote its jettability.

Some embodiments include a sensor and a controller. In these embodiments, the sensor senses a property of the resin and sends and a signal indicative of the property to the controller. Examples of such properties include rheological properties, such as viscosity, optical properties, such as refractive index, and temperature. This provides a basis for feedback control. For example, in the case of temperature, the controller is able to cause heat transfer between the resin and a heat-transfer system to control the temperature.

Some embodiments include a sensor and a controller that cooperate to regulate an amount of resin available for ejection from the printhead.

In another aspect, the invention features a method for carrying out additive manufacturing of a structure, the method comprising initiating curing of a resin while the resin is within an inkjet printer and causing the resin to be ejected from the inkjet printer before the resin has cured to such an extent that the resin can no longer be ejected from the inkjet printer.

Among the practices of the foregoing method are those in which curing of the resin is initiated by mixing precursors of the resin to make the resin within the inkjet printer.

Other practices of the invention feature controlling the resin's temperature while the resin is in the inkjet printer.

Other features and advantages of the invention are apparent from the following description, and from the claims.

DETAILED DESCRIPTION

Figure 1:
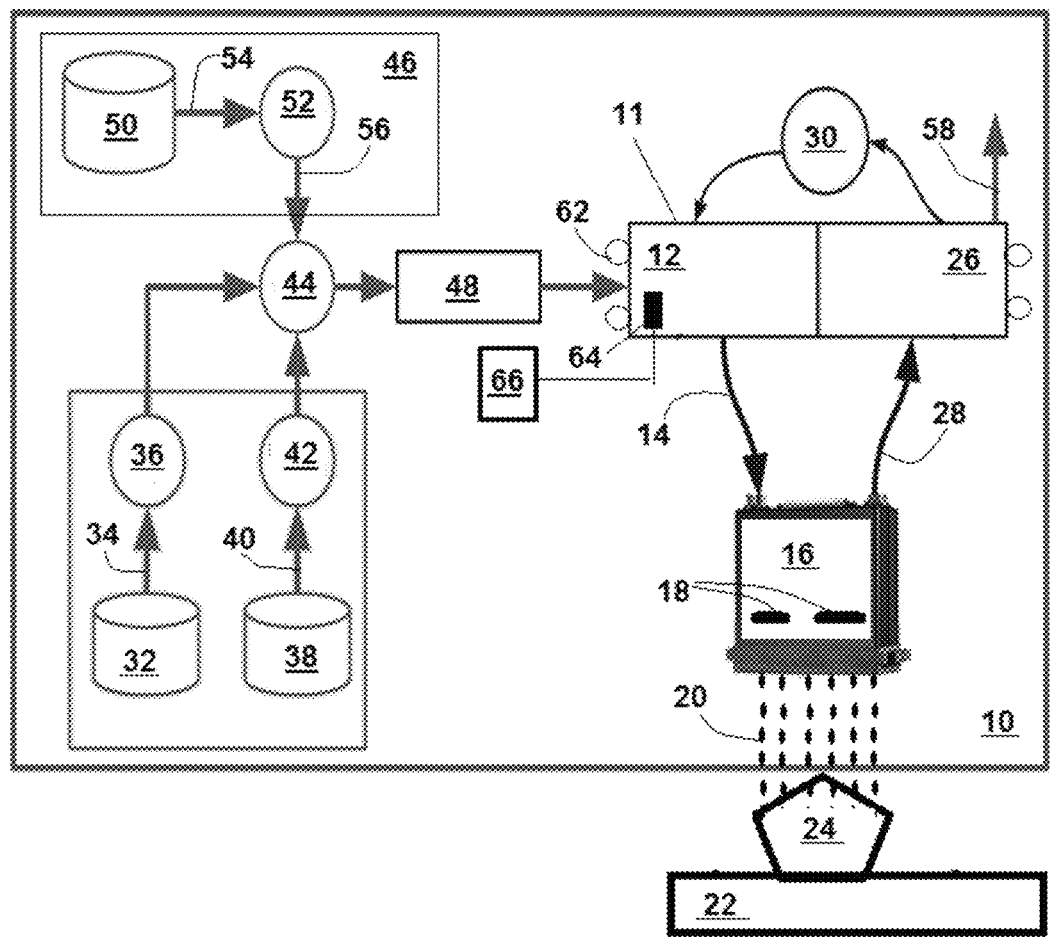
FIG. 1 shows an inkjet printer for mixing precursors into a resin and directing that resin to a printhead.

FIG. 1 shows an inkjet printer 10 having a reservoir 11 that includes a supply compartment 12 in which is stored a recently mixed resin. A supply line 14 connects the supply compartment 12 to a print head 16. The print head 16 uses piezoelectric elements 18 to eject droplets 20 of that resin towards a stage 22 on which a structure 24 is being manufactured.

In general, not all the resin that enters the printhead 18 will be ejected. The reservoir 11 thus includes a return compartment 28 to receive resin that has been returned via a return line 28. A recirculation pump 30 pumps recently returned resin from the return compartment 26 back to the supply compartment 12.

The inkjet printer 10 includes a first precursor tank 32 that connects, via a first precursor line 34, to a first metering pump 36. Similarly, a second precursor tank 38 connects, via a second precursor line 40, to a second metering pump 42.

The first and second metering pumps 36, 42 to a valve 44. The valve 44 also connects to a cleaning system 46 and to a mixer 48 that connects to the supply compartment 12.

The valve 44 transitions between an operating state and a cleaning state. In the operating state, the valve connects the first and second metering pumps 36, 42 to a mixer 48 and disconnects the cleaning system 46. As a result, metered amounts of the precursors enter the mixer 48. The mixer 48 mixes the precursors together to form the resin. The freshly mixed resin proceeds to the supply compartment 12 so that it can promptly be used.

The cleaning system 46 features a cleaning-solution tank 50, a third metering pump 52, a third line 54 that connects the third metering pump 52 to the cleaning-solution tank 50, and a fourth line 56 that connects the third metering pump 52 to the valve 44.

In the cleaning state, the valve 44 connects the cleaning system 46 to the mixer 48 and disconnects the first and second metering pumps 36, 42. As a result, the cleaning system 46 is able to flush cleaning solution through the various components that come into contact with the resin.

A fluid path begins at the valve 44, where the precursors first meet to form the resin. This fluid path extends through fittings, connectors, tubing, seals, mixers, pumps, etc., all of which the resin passes through during normal operation. These structures are all therefore chemically compatible with the resin.

Other embodiments of the inkjet printer 10 include more precursor tanks to permit the use of more than two precursors. Such embodiments can optionally include more than one valve 44 and more than one mixer 48 so that the additional precursors can be introduced further downstream. This permits additional flexibility in when precursors are added.

Figure 2:
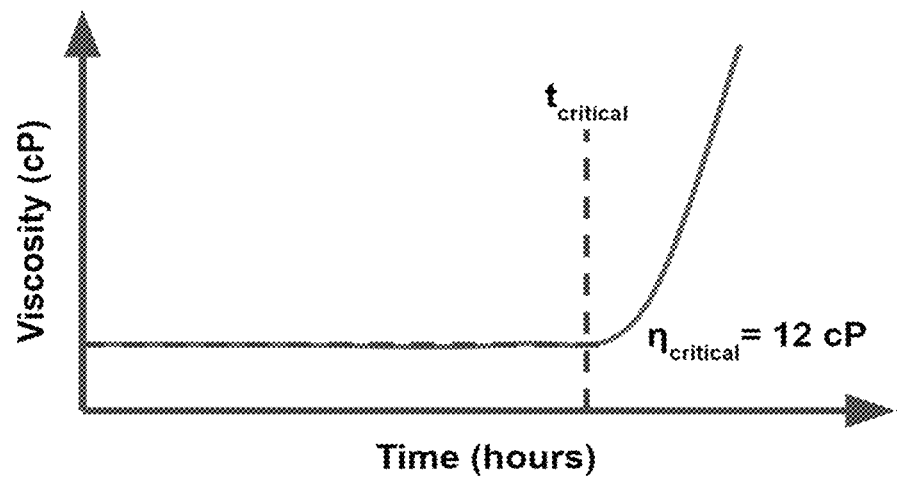
FIG. 2 shows viscosity as a function of time for a typical resin.

FIG. 2 shows viscosity of a typical resin as a function of time, with the resin's precursors having been mixed at the coordinate origin. As is apparent from the figure, the resin's viscosity remains relatively constant for an extended period after the precursors have been mixed. However, as the resin ages, there comes a time at which its viscosity rapidly rises. The location of this knee defines the resin's "pot life." Resin that is older than the pot life will be referred to as "aged resin." Resin that is not "aged resin" will be referred to as "fresh resin."

The resin's pot life determines how long the it can safely remain in the feed system of the inkjet printer 10. It is possible for small amounts of aged resin to remain, provided it is substantially diluted with fresh resin. However, in general it is preferable to avoid having any aged resin in the feed system.

To avoid having aged resin in the feed system, it is useful to have the fluid path through the feed system be as streamlined as reasonably possible. Such streamlining reduces the likelihood of dead zones.

Within a dead zone, flow stagnates. As a result, resin accumulates. Resin that is trapped in a dead zone thus has the opportunity to age beyond its pot life. As it does so, its viscosity increases, as shown in FIG. 2. This aged resin can eventually escape the dead zone and clog various components of the printer 10 that lie downstream of the dead zone.

It is also desirable to have the total volume of the fluid path be as small as possible. This will tend to reduce the resin's residency time, thus reducing its opportunity to age.

The fluid path requires periodic cleaning. Any fresh resin that happens to be in the fluid path at the time of cleaning will thus be flushed away. As a result, a fluid path having a small volume also avoids wasting fresh resin.

It is also important to provide ways to actively eliminate resin from the feed system to ensure that the bulk of the resin at any instant is fresh resin whose age is well below its pot life.

One way to actively eject resin is to purge the printhead 16. However, purging the printhead 16 requires stopping the printing process. This results in printer downtime, which impairs the printer's productivity.

An alternative method for actively ejecting resin is to us a dedicated output port or a drain pump. These would be operable during the printing process and would not impair the printer's productivity.

It is particularly useful to completely clean out the reservoir 11 during or after printing. This cleaning process includes ejecting as much resin as possible and flushing all components with a cleaning solution from the cleaning-solution tank 50 to promote complete removal of resin.

Such a cleaning procedure can be carried out in a variety of ways. One method of cleaning out the reservoir 11 is to pressurize it with air so as to eject the fluid via an outlet port 58. Another method relies on a cleanout piston that pushes the resin out of the reservoir 11 via the outlet port 58. Another method is to use an active drain pump to pump resin through the outlet port 58.

After resin has been removed from the feed system, the cleaning system 46 flushes the feed system one or more times with the cleaning-solution. In some embodiments, the cleaning system 46 recirculates the cleaning-solution multiple times through the feed system and the printheads to promote more complete removal of all residuary resin.

In the long run, even frequent cleaning cannot completely avoid accumulation of solid or high viscosity residues on the various components of the feed path. To promote ease of maintenance, it is useful for one or more components of the feed system to be modular components that are easily replaceable. Such replaceable modules are manufactured via injection molding, thermoforming or other techniques used in mass production.

The resin's aging process is driven by a rate of reaction. Since reaction rate typically depends on temperature, it is useful to include a heat-transfer system 62 to cool the resin in the reservoir 11. The heat-transfer system 62 maintains the resin in the reservoir 11 at a temperature that extends the pot life but that avoids increasing the resin's viscosity to the point at which it is no longer usable.

The heat-transfer system 62 is also useful to compensate for temperature of the environment in which the printer 10 is being used. For example, if the printer is being used at a location with an elevated temperature, the heat-transfer system 62 will have to cool the resin to avoid shortening the pot life. If the printer is being used at a cold location, the heat-transfer system 62 warms the resin to reduce its viscosity.

As a general rule of thumb, a ten-degree Celsius change in temperature either halves or doubles the resin's pot life depending on the direction of the change. Therefore, control of the resin's temperature is critical to ensure adequate pot life and to control viscosity to ensure robust and consistent jetting.

Some embodiments feature a sensor 64 that is disposed to monitor one or more characteristics of the mixed resin. Examples of suitable characteristics includes viscosity, surface tension, color, spectrum, and temperature, and optical properties such as refractive index. The output of the sensor 64 is provided to a controller 66 that controls one or more components, such as the heat-transfer system 62, the mixer 44, and the cleaning system 46.

Figure 3:
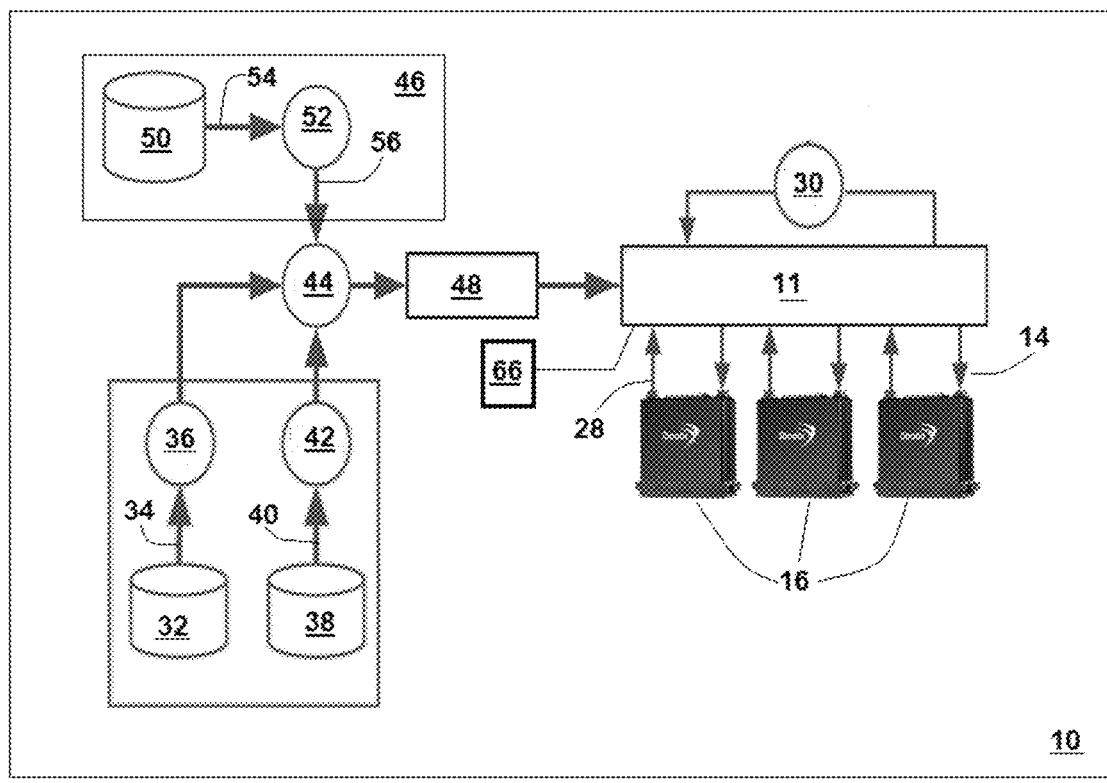
FIG. 3 shows an embodiment that feeds multiple print heads.

FIG. 3 shows an embodiment similar to that of FIG. 1 but with the reservoir 11 being connected to more than one printhead 16. This embodiment is particularly useful for printing wider swaths so as to accelerate the manufacturing process. Alternatively, the multiple printheads 16 can be connected to different feed systems so that each printhead 16 can print using its own separate resin supply. This would involve duplication of the components of the apparatus shown in FIG. 1, other than the cleaning system, which can be used to clean all the components provided that the cleaning solution is one that can dissolve all the resins used.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

Among these are other embodiments are those in which the printer includes different printheads that use different materials. In some of these embodiments, one of the materials is a support material.

Having described the invention and a preferred embodiment thereof, what is claimed as new and secured by Letters Patent is:

1. An apparatus comprising a feed system for an inkjet printer and a cleaning system for cleaning said feed system, said feed system being configured to mix precursors to form a resin for delivery to a printhead of said printer and comprising a mixer that mixes precursors to form a resin and a reservoir that receives said resin from said mixer for delivery to said printhead, said cleaning system being configured to flush cleaning solution through those paths within said feed system that said resin has traversed, said paths including said mixer, said reservoir, and said printhead.

2. The apparatus of claim 1, wherein said feed system comprises a first metering pump and a second metering pump, wherein said first and second metering pumps provide said precursors to said mixer, and wherein said resin is provided to said printhead for ejection.

3. The apparatus of claim 1, wherein said precursors are metered into an in-line active mixer.

4. The apparatus of claim 1, wherein said precursors are metered into an in-line passive mixer.

5. The apparatus of claim 1, wherein said reservoir provides resin to one or more printheads, said reservoir being pressurized to a controlled pressure.

6. The apparatus of claim 1, wherein said reservoir comprises a recirculation system that, in operation, causes at least some resin that has been delivered to said printhead from said reservoir to be returned to said reservoir and recirculated for delivery back to said printhead from said reservoir.

7. The apparatus of claim 1, wherein said reservoir comprises a storage compartment, a return compartment, and a recirculation pump, wherein resin from said storage compartment that has been delivered to said printhead is returned to said return compartment and pumped back to said storage compartment by said recirculation pump.

8. The apparatus of claim 1, wherein one or more components of said feed system that are in contact with said resin are modular and replaceable.

9. The apparatus of claim 2, further comprising a valve that connects to said first and second metering pumps, said mixer, and a cleaning system, wherein said valve transitions between an operating state and a cleaning state, wherein, in said operating state, said valve connects said metering pumps to said mixer and disconnects said cleaning system from said mixer, and wherein, in said cleaning state, said valve connects said cleaning system to said mixer and disconnects said first and second metering pumps from said mixer.

10. The apparatus of claim 1, wherein components through which said resin pass define a streamlined fluid path having no dead zones.

11. The apparatus of claim 1, further comprising a heat-transfer system for causing heat to flow away from said resin.

12. The apparatus of claim 1, further comprising a sensor and a controller, wherein said sensor is configured to sense a property of said resin and to transmit a signal indicative of said property to said controller.

13. The apparatus of claim 1, further comprising a temperature sensor that senses temperature of said resin, wherein a controller is configured to cause heat transfer between said resin and a heat-transfer system to control said temperature of said resin.

14. The apparatus of claim 1, further comprising a viscosity sensor and a controller, wherein said sensor is configured to sense viscosity of said resin to be used for controlling said viscosity of said resin.

15. The apparatus of claim 1, further comprising a sensor and a controller that cooperate to regulate an amount of resin available for ejection from said printhead.

16. The apparatus of claim 1, further comprising first and second precursor tanks that comprise first and second precursors therein, wherein said precursors, when mixed, form said resin.

17. The apparatus of claim 1, wherein said precursors flow past a moving structure that applies kinetic energy to said precursors.

18. The apparatus of claim 1, wherein said precursors flow together through a convoluted path.

19. The apparatus of claim 1, wherein said apparatus comprises said printhead and said printhead comprises piezoelectric elements.

* * * * *